United States Patent
De Buen-Unna et al.

(10) Patent No.: US 6,660,077 B2
(45) Date of Patent: Dec. 9, 2003

(54) ADDITIVE FOR THE PREPARATION OF ECOLOGICAL PERMEABLE CONCRETES WITH HIGH COMPRESSION, BENDING AND ABRASION RESISTANCE, AND PRODUCTION PROCESS

(76) Inventors: Nestor De Buen-Unna, Islas de Revillagigedo No. 7, Colonia Residencial Chiluca Atizapan de Zaragoza (MX), 52930; Luis German Guevara-Nieto, Roqueta No. 210, Colonia Lomas de Bezares (MX), 11910; Jaime Grau-Genesias, Grevilias 384, Colonia Lomas de Cuernavaca (MX)

( * ) Notice: Subject to any disclaimer, the term of this patent is extended or adjusted under 35 U.S.C. 154(b) by 144 days.

(21) Appl. No.: 09/902,045

(22) Filed: Jul. 10, 2001

(65) Prior Publication Data

US 2003/0061970 A1 Apr. 3, 2003

(51) Int. Cl.[7] .................... C04B 24/00; C04B 24/16
(52) U.S. Cl. .............. 106/692; 106/725; 106/726; 106/738; 106/823
(58) Field of Search ................ 106/725, 726, 106/692, 738, 823

(56) References Cited

FOREIGN PATENT DOCUMENTS

DE        1953158        * 5/1971

* cited by examiner

*Primary Examiner*—Paul Marcantoni
(74) *Attorney, Agent, or Firm*—Timothy J. Keefer; Wildman, Harrold, Allen & Dixon LLP

(57) ABSTRACT

An additive for elaboration of ecological permeable concretes. The additive containing from about 24.5% to 28.2% by weight of a mixture made of dispersing agents, from about 3.3% to 3.8% by weight of a humectant agent, from 0 to about 1% by weight of a non ionic surfactant, from 0 to about 3% by weight basis of a bactericidal agent, from about 3.3% to 3.8% by weight of hydroxypropylethyl or methylcellulose from 0 to about 0.3% by weight of an antifoaming agent and from about 55.8% to 64.2% by weight of a highly reactive non-crystalline calcinated silica aluminant.

5 Claims, No Drawings

ADDITIVE FOR THE PREPARATION OF ECOLOGICAL PERMEABLE CONCRETES WITH HIGH COMPRESSION, BENDING AND ABRASION RESISTANCE, AND PRODUCTION PROCESS

BACKGROUND

There is presently a growing need for permeable floors that allow water filtration into the subsoil. However, the construction of permeable concrete floors entails serious problems due mainly to their very low bending and compression resistance, and also because they tend to crumble. There is, for instance, the case of concrete without fines that is permeable but crumbles easily.

Mexican patent application No 962170 (abandoned), filed by the same inventors, describes a permeable product that solves this problem. This product can be made with terpolymers, using type 1 cement.

The additive, main purpose of this invention, noticeably improves the characteristics of the former version, which could only be mixed with type 1 cement. Although that version has some limitations, it shows good bending, compression and abrasion resistance. Its limitations are listed below:

- it does not meet the resistance requirements for every type of use, so this product can only be used in parking lots, medium and low traffic streets, and pedestrian walkways;
- it is very expensive;
- its resistance cannot be easily controlled;
- it must be packed dry; and
- it does not set properly at very low temperatures.

The product of the present invention, when mixed with any type of cement, water and any hard aggregate with granulometries higher than 4 mm, provides a long lasting permeable concrete with high resistance to bending, compression and abrasion, showing excellent performance in any weather with the following advantages:

- different proportions lead to different controllable levels of resistance;
- it can be packed as a liquid or as a solid;
- it is price-competitive with other commonly used pavements;
- this new product can be used practically in any kind of weather;
- this product does not degrade, because its formula contains silica aluminate, an inorganic material that reacts when combined with cement, providing great resistance to bending, compression and abrasion;
- this additive results in a concrete mixture that may be used to make permeable ecological paving stone blocks; and
- as a solid, this additive may be packed together with cement and stone aggregate in different ratios, according to the required resistance, for easy Do it Yourself projects.

DETAILED DESCRIPTION

Generally, the composition of this invention contains the following basic ingredients: dispersing agents, humectants, hydroxypropylethylcellulose, or hydroxypropylmethylcellulose and silica aluminates. It may also contain, depending on the type of product required, some optional ingredients such as water, surfactant, bactericidal and antifoaming agents.

The characteristics of this invention are such that upon contacting with cement and water, a chemical reaction occurs, giving as a result that the cement adhesiveness increases. The contact points of the aggregate will be very strong, resulting in a product with great cohesion despite the lack of fines such as sand.

In the construction of permeable surfaces some stone aggregates such as, andecite, basalt, vesicular basalt, volcanic red stone, rhyolite, microdiorite, granite, limestone, barite, marble, silica and, in general, any other stone aggregates have been successfully tried. However, it is important to mention that slags can substitute stone aggregates.

The product obtained by using the additive of the this invention can be structurally reinforced with either metal or plastic in the form of rods or meshes.

The lack of fines results in a material with high permeability and no deformation due to temperature variations.

High resistance permeable concretes obtained by using the additive of this invention can be used to build pedestrian paths, walkways and sidewalks, plazas, borders, parking lots, street and highway pavement, retaining walls, breakwater tops, wharf tops, paths for sown lands to improve pest control, cattle corral floors, highways and runways that prevent hydroplaning, and permeable slabs.

And, in general, for any purpose that requires a permeable high strength surface, either to allow water to pass through into the ground or to channel it and take it elsewhere, and which, in addition, makes it possible to reduce or eliminate storm drains.

The additive, which is the main purpose of this invention, can be packed in tank trucks, drums, cans and/or buckets, facilitating its further use, when mixed with cement, stone aggregate and water, to obtain a permeable concrete.

According to the previous description, an additive formula to make permeable concretes with high compression, bending and abrasion resistance is provided.

Of course, the proportions used when mixing different ingredients will basically depend on the product's end use or application. Different proportions will lead to concretes with different resistance, according to the following formulation:

The formulation to produce 100 kg of additive is:

| Ingredient | | | | |
|---|---|---|---|---|
| Water | from | 0.0% | to | 10.4% |
| Dispersing agent (high molecular weight Condensed naphthalene sulphonic acid sodium salt) | from | 15.4% | to | 13.4% |
| Dispersing agent (naphthalene sulphonic acid calcium salt) | from | 3.8% | to | 3.3% |
| Dispersing agent (melamine-formaldehyde polymer) | from | 9.0% | to | 7.8% |
| Humectant (concentrated alkylarynaphthalene sulphonate) | From | 3.8% | to | 3.3% |
| Non ionic surfactant (tensoactive derived from nonyl phenol And ethylene oxide) | from | 0.0% | to | 1.0% |
| Anionic surfactant (dioctyl or tridecyl sodium sulphocyanate) | from | 0.0% | to | 1.1% |
| Bactericidal agent | from | 0.0% | to | 0.3% |
| Hydroxypropyl-ethyl or methyl cellulose | from | 3.8% | to | 3.3% |
| Antifoaming | from | 0.0% | to | 0.3% |
| Non crystalline calcinated highly reactive silica aluminate | from | 64.2% | to | 55.8% |
| | | 100.0% | | 100% |

The following materials are required to produce 1 m³ of permeable concrete:

| | |
|---|---|
| Water | 50 to 110 liters |
| Liquid additive | 9% to 10% on a cement weight basis |
| Stone aggregate | 1 m³ |
| Cement | 120.00 to 360.00 kg |

The following materials are required to produce a solid additive mix:

| | |
|---|---|
| Water | 50 to 100 liters |
| Solid additive | 6% to 8% on a cement weight basis |
| Stone aggregate | 1 m³ |
| Cement | 120.00 to 360 kg |

The additive ingredients provide the following advantages:

Once the dispersing agents, humectant, non ionic and anionic surfactants are mixed with cement, they provide a very effective aggregate reduction which increases the ecological permeable concrete's resistance to bending, compression and abrasion.

Non crystalline calcinated highly reactive silica aluminate is an inorganic material that due to its characteristics causes a reaction with cement, providing the ecological permeable concrete with a significant increase in bending, compression and abrasion resistance.

Because non crystalline calcinated highly reactive silica aluminate is an inorganic and not an organic material like the different types of resins used in concrete production, it is not affected by UV rays exposure.

Hydroxypropylethyl or methylcellulose offers better application properties. Permeable concrete made with these components has a longer surface drying time, and more ductility.

This additive, compared to the one previously described in Mexican patent application No 962,170, has the following advantages:

| | Former | New |
|---|---|---|
| F'c | 200 kg/cm² | 350 kg/cm² |
| Bending modulus | 30 kg/cm² | 70 kg/cm² |
| Ease of application | Poor | Excellent |
| Does it pollute? | Slightly | No |

The following are some examples of the best way to take this invention in practice, but they should by no means be considered as limitative.

I. EXAMPLE 1

1. Preparation of an Additive Composition in Liquid Form

To prepare a liquid additive the following steps are followed:

a) The required amount of water is disposed;
b) addition of dispersing agents and humectant agent
c) addition of non ionic surfactant
d) addition of anionic surfactant
e) addition of bactericidal agent
f) addition of antifoaming agent
g) addition of hydroxypropylethylcellulose or hydroxypropylmethylcellulose
h) addition of non crystalline silica aluminate.

These steps are performed while mixing constantly in order to obtain a homogeneous and stable liquid product.

II. EXAMPLE 2

Procedure to Prepare a Solid Additive

The following steps are followed when preparing a solid additive:

a) Mixing dispersing agents and humectant agent;
b) Adding non ionic surfactant;
c) Adding anionic surfactant;
d) Adding hydroxypropylethylcellulose or hydroxypropil-methyl-cellulose;
e) Adding non crystalline silica aluminate These steps are performed while mixing constantly in order to obtain a homogenous and solid mixture.

Different mixtures can be obtained with this new additive for different levels of bending and compression resistance which in turn result in mixtures for different purposes.

With a f'c=100 kg/cm² concrete, filling layers that are stable to work on can be built;

With a f'c=200 kg/cm² concrete, paths, sidewalks and cycling trails can be built;

With a f'c=250 kg/cm² concrete, parking lots, medium traffic streets and garages can be built;

To build loading platforms, avenues, highways and landing strips, a mixture of f'c=300 kg/cm² is required.

The new formulation allows the use of built in color in mixtures.

The following mixtures lead to different resistances:

| F'c (kg/cm²) | | | | | |
|---|---|---|---|---|---|
| Dispersing agent (condensed high molecular weight naphthalenesulphonic acid sodium salt) | 1.400 | 1.200 | 3.900 | 4.300 | 3.500 |
| Dispersing agent (naphthalenesulphonic acid calcium salt) | 0.300 | 0.600 | 0.900 | 1.000 | 0.700 |
| Dispersing agent (melamine polymer and formaldehyde) | 0.000 | 1.500 | 1.600 | 2.000 | 1.500 |
| Humectant (concentrated alkylaryl naphthalene sulphonate) | 0.100 | 0.270 | 0.400 | 0.600 | 0.300 |
| Non ionic surfactant (tensoactive derived from nonilphenol and ethylene oxide) | 0.000 | 0.000 | 0.000 | 0.000 | 0.300 |
| Anionic surfactant (dioctyl sulphocyanate) or sodium tridecyl) | 0.000 | 0.270 | 0.330 | 0.400 | 0.300 |
| Bactericidal agent | 0.030 | 0.080 | 0.100 | 0.100 0. | 0–80 |
| Hydroxypropylethyl or methylcellulose | 0.000 | 0.800 | 1.000 | 1.100 | 0.800 |
| Antifoaming | 0.030 | 0.080 | 0.100 | 0.100 | 0.08 |
| Non crystalline calcinated silica aluminate and Highly reactive | 4.000 120.000 | 10.000 270.000 | 13.200 330.000 | 10.00 0 360.000 | 4.000 270.000 |

-continued

| F'c (kg/cm²) | | | | | |
|---|---|---|---|---|---|
| Color (iron oxides) | 0.000 | 0.000 | 0.000 | 0.000 | 13.500 |
| Sandless stone aggregate | 1 m³ | 1 m³ | 1 m³ | 1 m³ | 1 m³ |
| Water | 50.000 | 300.000 | 105.000 | 110.000 | 65.000 |

The quantities are expressed in kilograms.

Higher resistance can be achieved by modifying the additive and cement proportions.

III.

IV. EXAMPLE 3

Procedure to Obtain Low Compression Resistance Permeable Concrete

In a container with 50 liters of water, 1.400 kg of condensed high molecular weight naphthalene sulphonic acid sodium salt, and 0.300 kg of naphthalene sulphonic acid calcium salt together are mixed with 0.100 kg of humectant made of concentrated aryl alkyl naphthalene sulphonate; then 0.020 kg of bactericide and 0.030 kg of antifoaming agents, 4.000 kg of non crystalline silica aluminate and 120 kg of cement are added to this mixture and, finally, 1 m³ of a sandless stone aggregate was added. The mixture was sufficiently mixed to obtain a full uniform bled. The result is a permeable concrete having a f'c=100 kg/cm²

V. EXAMPLE 4

Procedure to Obtain High Compression Resistance Permeable Concrete

In 110 liters of water, 4.300 kg of condensed high molecular weight naphthalene sulphonic acid sodium salt and 1.000 kg of naphthalene sulphonic acid calcium salt are mixed with 2.000 kg of a melamine formaldehyde polymer and 0.600 kg of humectant made of concentrated arylalkyl naphthalene sulphonate; followed by 0.400 kg of anionic surfactant and 0.100 kg of bactericidal agent; then 1.100 kg of hydroxypropylmethylcellulose and 0.100 kg of an antifoaming agent are added to the mixture, as well as 18.000 kg of non crystalline silica aluminate and 360 kg of cement. The mixture is sufficiently mixed to obtain a full and uniform blend. The result is a permeable concrete with a f'c=300 kg/cm²

VI. EXAMPLE 5

Procedure to Obtain Colored Permeable Concrete

In 65 liters of water, 3.500 kg of condensed high molecular weight naphthalene sulphonic acid sodium salt and 0.700 kg of naphthalenesulphonic acid calcium salt were mixed with 1.500 kg of a melamine formaldehyde polymer and 0.300 kg of a humectant made of concentrated arylalkyl naphthalene sulphonate; followed by the addition of 0.300 kg of non ionic surfactant and 0.300 kg of anionic surfactant and 0.080 of bactericide; then 0.800 kg of hydroxypropylethyl cellulose and 0.080 kg of antifoaming agent were added, followed by the addition of 4.000 kg of non crystalline silica aluminate and 270 kg of cement; followed by 13.500 kg of a iron oxide based colorant. The mixture was mixed sufficiently to achieve a full and uniform blend. Finally, 1 m³ of sandless stone aggregate was added. The result is a colored permeable concrete with a f'c=200 kg/cm².

Although the previous description includes the best known method to implement this technological development, it is evident that the spirit and scope of the invention will not be affected by some modifications. So it is essential to emphasize that should this invention, even after its disclosure be partially or totally used in another field, such use must be considered as a modality of application and by no means as a new invention.

What is claimed is:

1. An additive for elaboration of ecological permeable concretes having high compression, bending and abrasion resistance, comprising:
   from about 24.5% to 28.2% by weight of a mixture made of dispersing agents; from about 3.3% to 3.8% by weight of a humectant agent; from 0 to about 1% by weight of a non ionic surfactant; from 0 to about 1.1% of an anionic surfactant; from 0 to about 3% by weight basis of a bactericidal agent; from about 3.3% to 3.8% by weight of hydroxypropylethyl or methylcellulose, from 0 to about 0.3% by weight of an antifoaming agent; and from about 55.8% to 64.2% by weight of a highly reactive non crystalline calcinated silica aluminate.

2. An additive for the elaboration of ecological permeable concretes according to claim 1, wherein the mixture of dispersing agents consists of a naphthalene sulphonic acid sodium salt; a naphthalene sulphonic acid calcium salt, and a melamine formaldehyde polymer.

3. An additive for the elaboration of ecological permeable concretes according to claim 1, wherein the humectant agent is an alkylaryl naphthalene sulphonate.

4. A process for preparing the additive for the elaboration of ecological permeable concrete having high compression, bending and abrasion resistance as claimed in claim 1, comprising the steps of:
   a) providing a container with water;
   b) adding from about 24.5 to 28.2% by weight of a mixture of dispersing agents;
   c) adding from about 3.3 to 3.8% by weight of a humectant agent;
   d) adding from 0 to about 1% by weight of a non ionic surfactant;
   e) adding from 0 to about 1.1% by weight of an anionic surfactant;
   f) adding from 0 to about 3% by weight of a bactericidal agent;
   g) adding from 0 to about 0.3% by weight of an antifoaming agent;
   h) adding from about 3.3 to 3.8% by weight of hydroxypropylethylcellulose or hydroxypropylmethylcellulose;
   i) adding from about 55.8% to 64.2% by weight of a non crystalline silica aluminate;

wherein the above ranges are based on the total weight of the additive, and wherein steps a) through i) are performed at room temperature with constant and uniform mixing until a stable and homogeneous liquid product is obtained.

5. A process for obtaining a solid additive formulation for the elaboration of an ecological permeable concrete having a high compression, bending and abrasion, comprising the steps of:
   a) mixing a mixture of from about 24.5 to 28.2% by weight of dispersing agents and from about 3.3 to 3.8% by weight of a humectant;

b) adding from 0 to about 1.1% by weight of an anionic surfactant;
c) adding from about 3.3 to about 3.8 by weight of hydroxypropylethylcellulose or hydroxypropylmethylcellulose;
d) adding from about 55.8% to 64.2% by weight of a highly reactive calcinated non crystalline silica aluminate;

wherein the above ranges are based on the total weight of the additive formulation, and wherein all the steps mentioned above are performed by thoroughly mixing the ingredients when added in order to obtain a homogeneous mixture.

* * * * *